United States Patent [19]
Morikawa et al.

[11] Patent Number: 5,730,089
[45] Date of Patent: Mar. 24, 1998

[54] COOLING WATER CIRCULATING SYSTEM FOR INTERNAL COMBUSTION ENGINE OF VEHICLE

[75] Inventors: Toshio Morikawa, Toyota; Yoshimitsu Inoue, Toyoake; Hikaru Sugi, Nagoya; Shinji Aoki; Yasutoshi Yamanaka, both of Kariya, all of Japan

[73] Assignee: Nippondenso Co., Ltd., Kariya, Japan

[21] Appl. No.: 613,389

[22] Filed: Mar. 7, 1996

[30] Foreign Application Priority Data

Mar. 8, 1995 [JP] Japan ................................ 7-048302

[51] Int. Cl.⁶ ................................................. F01P 11/02
[52] U.S. Cl. ............................... 123/41.14; 123/41.33; 237/12.3 B
[58] Field of Search ...................... 123/41.14, 41.29, 123/41.31, 41.33, 142.5 R; 237/12.3 B

[56] References Cited

U.S. PATENT DOCUMENTS

| | | | |
|---|---|---|---|
| 3,523,644 | 8/1970 | Kozinski | 237/12.3 B |
| 5,211,334 | 5/1993 | Schatz | 237/12.3 B |

FOREIGN PATENT DOCUMENTS

| | | |
|---|---|---|
| 1-172015 | 7/1989 | Japan. |
| 2-120118 | 5/1990 | Japan. |

*Primary Examiner*—Noah P. Kamen
*Attorney, Agent, or Firm*—Cushman Darby & Cushman IP Group of Pillsbury Madison & Sutro LLP

[57] ABSTRACT

A coolant circulation circuit of an internal combustion engine includes a heat accumulation tank having a heat insulating structure and a heater core for heating air for heating a compartment in the vehicle. High temperature coolant is reserved in the heat accumulation tank even when the engine is stopped. An intake air heat exchanger is disposed in the circuit on the downstream side of the heater core, and high temperature coolant can effectively heat the intake air. An engine lubricating oil heat exchanger and a transmission operating oil heat exchanger are arranged in the circuit on the downstream side of the intake air heat exchanger. Intake air, engine lubricating oil and transmission operating oils are suitably heated during warm-up of the engine to thereby improve fuel economy and reduce exhaust gas pollution.

12 Claims, 5 Drawing Sheets

COOLING WATER CIRCULATING SYSTEM FOR INTERNAL COMBUSTION ENGINE OF VEHICLE

BACKGROUND OF THE INVENTION

1. Field of the Invention

The present invention relates to a coolant circulating system in a water-cooled type internal combustion engine mounted to a vehicle, and in particular, the present invention relates to a coolant circulating system which can drastically improve fuel efficiency and reduce exhaust gas pollution by appropriately controlling a coolant temperature and other factors.

2. Description of the Related Art

As petroleum resources have increasingly run short and the environment has continued to deteriorate in recent years, further reductions in vehicle fuel consumption and pollution emissions have become critical.

Various attempts have been made to improve vehicle fuel efficiency and reduce exhaust gas emissions during driving using existing technology such as lean burning engines. However, an effective method of reducing fuel consumption and pollutant emissions during the engine warm-up period has not yet been suggested.

For example, a remote control starter capable of starting a vehicle's engine from a distance has been used in practice. This remote control starter can shorten the waiting time for warm-up after a driver gets in the vehicle, but hardly contributes to fuel efficiency improvements and reduced exhaust emissions during engine warm-up.

Japanese Unexamined Patent Publication (Kokai) No. 1-172015 proposes a coolant circulating system comprising a heat-accumulation tank having a heat insulating structure arranged in a coolant circulating circuit of an internal combustion engine. The heat accumulation tank accumulates coolant at the high temperature reached during the operation of the internal combustion engine, and the hot coolant can then be delivered from the heat accumulation tank into a heater core of an air conditioner for heating a compartment of a vehicle at the next start of the engine while the temperature of the coolant in the engine is still low.

According to the prior art described above, however, high temperature coolant delivered from the heat accumulation tank into the heater core is subjected to heat exchange with air blown into the heater core by an air conditioning blower, and its temperature drastically drops. As a result, the temperature of the coolant which is returned to the engine drops. Therefore, although high temperature coolant is accumulated in the heat accumulation tank, warm-up performance is not significantly affected, and the fuel efficiency and exhaust gas emission levels during warm-up of the engine are not improved.

SUMMARY OF THE INVENTION

In view of the problem described above, the object of the present invention is to provide a new coolant circulating system in an internal combustion engine of a vehicle which can effectively reduce fuel consumption and pollutant emissions, particularly during engine warm-up.

To accomplish this object, the present invention employs the following technical means.

In accordance with the present invention, a lubricating oil of the internal combustion engine and an operating oil of an automatic transmission, for example, can be effectively heated by heat exchangers which exchange heat between the high temperature coolant accumulated in a heat accumulation tank and the engine lubricating oil and automatic transmission operating oil. Coolant having a relatively high temperature after passing through the heat exchangers can then be returned to the engine. Therefore, warm-up of the engine can be carried out effectively, reducing fuel consumption and exhaust gas pollution.

In the same way when the external air temperature is low, for example in winter, intake air in the engine can be effectively heated, and coolant having a relatively high temperature after heating the intake air can be returned to the engine. Accordingly, the reduction of fuel consumption and purification of the exhaust gas can be effectively accomplished.

In particular, according to the invention control means controls a flow control valve directing flow through the heat exchanger and a blower directing air through an air conditioning heater core so that the flow control valve is fully open and the blower is off when the engine is warming up. Therefore, the oils and intake air can be effectively heated without heat radiation in the heater core, and coolant having a relatively high temperature can be charged into the internal combustion engine. In this way, fuel efficiency is improved and exhaust gas production reduced even more effectively.

After the engine has warmed up, the control means controls the flow control valve and the blower in accordance with an air conditioning control program. By virtue of this program, in the winter season, the opening of the flow control valve and the flow rate of coolant to the warming heater core is often increased. In consequence, the coolant temperature at the outlet of the heater core becomes high, and it can heat the oils or intake air.

Because the necessary heating capacity of the warming heater core in the seasons from spring to fall is smaller, the opening of the flow control valve and the flow rate of coolant to the heater core is further reduced. In consequence, the coolant temperature at the outlet of the heater core becomes lower, and the oils or intake air can be cooled.

BRIEF DESCRIPTION OF THE DRAWINGS

These and other objects and features of the present invention will become more apparent from the detailed description when taken in conjunction with the accompanying drawings, in which.

DESCRIPTION OF THE PREFERRED EMBODIMENTS

Figure 1:
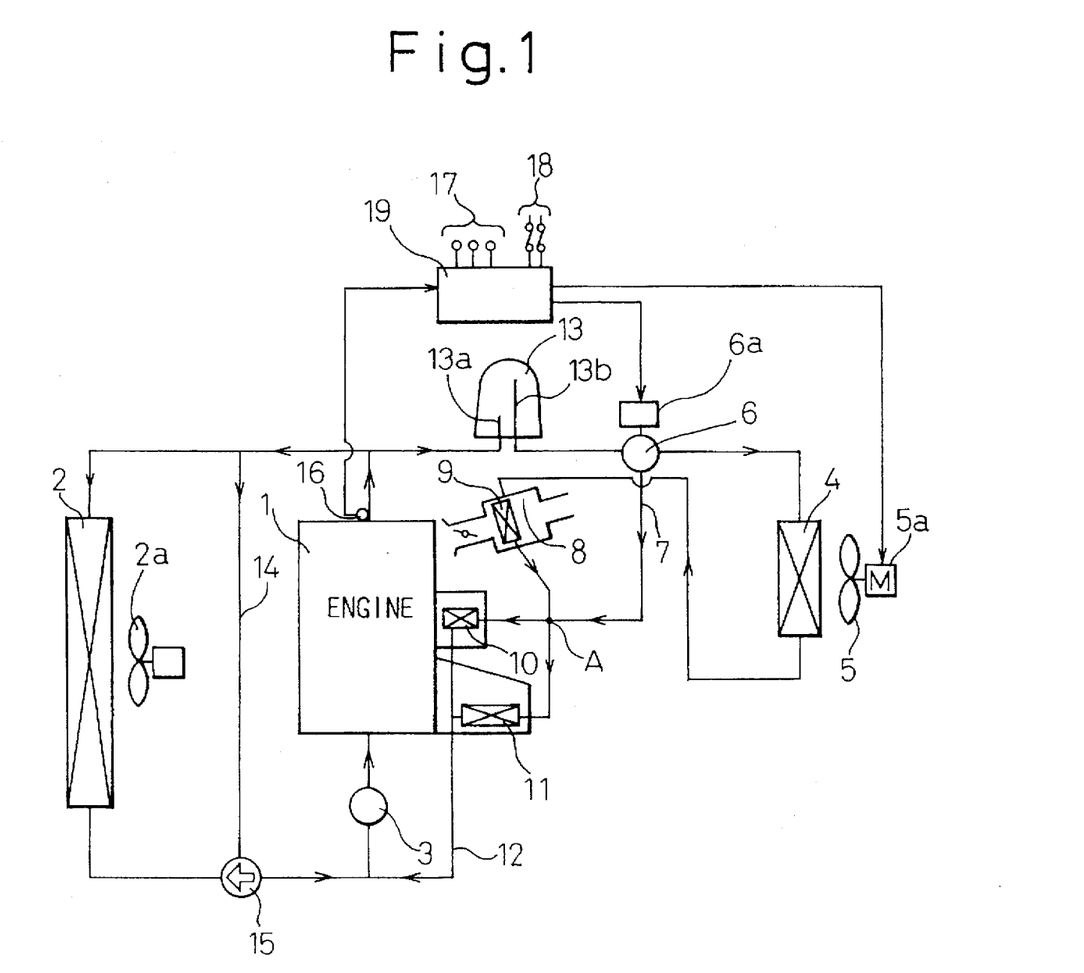
FIG. 1 is a circuit diagram of a coolant circulating system in an internal combustion engine according to the first embodiment of the present invention.

FIGS. 1 to 4 show the first embodiment of the present invention. In FIG. 1, reference numeral 1 denotes an internal combustion engine for propelling a vehicle, the engine being of a water-cooled type having a coolant circulation circuit.

Reference numeral 2 denotes a radiator disposed in the coolant circulation circuit to cool coolant by exchanging heat between the air blown by a cooling fan 2a and the coolant in the engine 1. Reference numeral 3 denotes a water pump driven by the engine to circulate coolant through the coolant circulation circuit, and connected in this embodiment to the coolant inlet side of the engine 1.

Reference numeral 4 denotes a heater core (heat exchanger) for heating air conditioning air delivered by a blower 5 by exchanging heat between the coolant and the air conditioning air (not shown). The heater core 4 is disposed in an air conditioning passage on the downstream side of an evaporator in a refrigerating system, and air cooled by the evaporator is re-heated by the heater core 4 to a predetermined temperature so as to control the temperature of air to be blown into a compartment. The blower 5 is of an electric type which is driven by a motor 5a.

A flow control valve 6 is disposed in the coolant circulation circuit on the coolant inflow side of the heater core 4. When the flow rate of hot coolant into the heater core 4 is controlled by regulating the valve opening of this flow control valve 6, the heating quantity of the heater core 4 and, eventually, the temperature of air blown into the compartment, can be controlled.

Reference numeral 7 denotes a bypass circuit disposed in the coolant circulation circuit in parallel with the heater core 4. The flow control valve 6 in this embodiment comprises a three-way valve for regulating the flow of coolant into the heater core 4 and into the bypass circuit 7, and a valve opening of this flow control valve 6 can be controlled continuously and electrically by a servo motor 6a.

Reference numeral 8 denotes an air cleaner for purifying intake air passing into the engine, and reference numeral 9 denotes an intake air heat is exchanger disposed in the air cleaner 8 and subjecting intake air passing into the engine 1, and the coolant, to heat exchange. The intake air heat exchanger 9 is disposed in the coolant circulation circuit in series with the heater core 4 and on the downstream side of the heater core 4. The coolant circulation circuit merges with the bypass circuit 7 at a position "A" on the downstream side of the intake air heat exchanger 8.

Reference numeral 10 denotes a first oil heat exchanger for subjecting an engine lubricating oil and cooling water to heat exchange, and reference numeral 11 denotes a second oil heat exchanger for subjecting an automatic transmission operating oil and coolant to heat exchange. These oil heat exchangers 10 and 11 are disposed in parallel between the merging point "A" and a cooling water circuit portion 12 which is connected to the inlet side of the water pump 3 in this embodiment.

Reference numeral 13 denotes a heat accumulation tank for storing high temperature coolant. In order to restrict heat radiation from the heat accumulation tank 13, the heat accumulation tank 13 has a vacuum-insulating structure constructed in the same way as the heat accumulation tank described in Japanese Unexamined Patent Publication (Kokai) No. 1-172015. The heat accumulation tank 13 is inserted into the coolant circulation circuit between the coolant outlet side of the engine 1 and the inlet side of the flow control valve 6. The heat accumulation tank 13 has an inlet pipe 13a having an outlet opening communicating with the interior of the heat accumulation tank 13 and an outlet pipe 13b having an inlet opening communicating with the interior of the heat accumulation tank 13, the position of the outlet opening of the inlet pipe 13a being lower than that of the inlet opening of the outlet pipe 13b in the vertical direction. The capacity of the heat accumulation tank 13 is approximately 3 liters in this embodiment, though it may be increased or decreased to meet particular needs.

Reference numeral 14 denotes a bypass circuit disposed in parallel with the radiator 2, and reference numeral 15 denotes a thermostat (valve responsive to coolant temperature) for controlling the flow of coolant to the bypass circuit 13. The thermostat 15 causes a valve body (not shown) to move due to a change with temperature of the volume of a thermo-wax, and switches the flow path of coolant. More particularly, when the coolant temperature is low, the thermostat 15 opens the bypass circuit 14 to allow cooling water to flow therethrough. When the coolant temperature rises above a predetermined temperature, on the other hand, the thermostat 15 opens the circuit toward the radiator 2 and closes the bypass circuit 14 thereby allowing the radiator 2 to cool the coolant.

Reference numeral 16 denotes a temperature sensor for detecting the coolant temperature at the coolant outlet of the internal combustion engine 1. The sensor 16 comprises a thermo-sensitive element such as a thermistor. Reference numeral 17 denotes a group of known sensors for automatic control of the air conditioner of the vehicle. The sensors include a compartment temperature sensor for detecting the temperature in the compartment, an external air sensor for detecting the external temperature, a solar radiation sensor for detecting a solar radiation quantity, an evaporator temperature sensor for detecting the temperature in the cooling evaporator, and so on.

Reference numeral 18 denotes a group of switches disposed on a control panel (not shown) for the air conditioner of the vehicle. Reference numeral 19 denotes an electronic controller for the air conditioner, using a microcomputer. The microcomputer judges and computes the input signals inputted from the sensors 16 and 17, and the switches 18, etc., in accordance with a predetermined program, and controls the operations of the blower 5 and the flow control valve 6 on the basis of the result of the arithmetic operation.

The electronic controller 19 automatically controls the operations of an internal/external air introduction switching door and a blowing port switching door (not shown) in the air conditioner in the vehicle in a known method.

Figure 2:
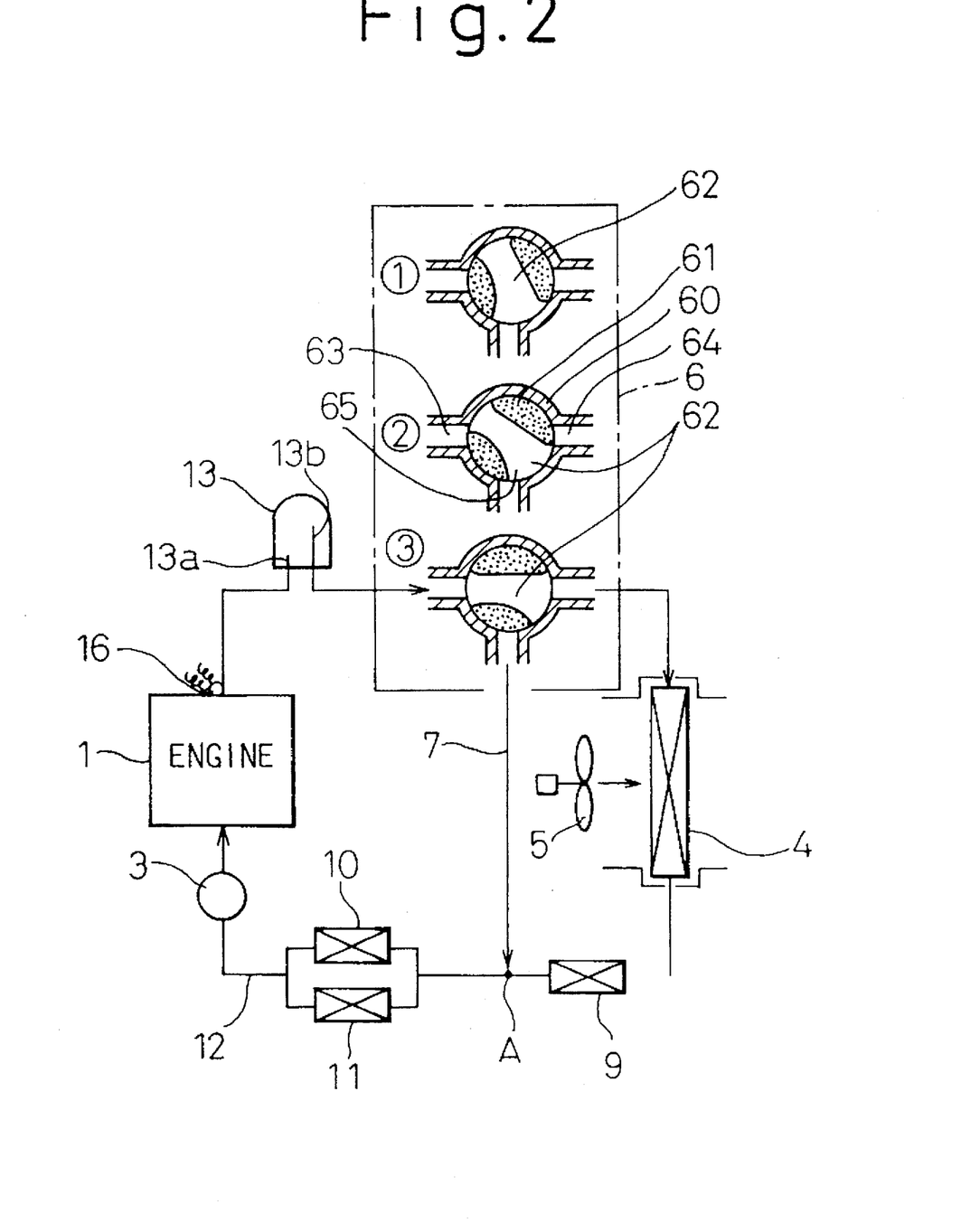
FIG. 2 is a circuit diagram of a part of the coolant circulating system of FIG. 1, illustrating the operation of the flow control valve.
Figure 3:
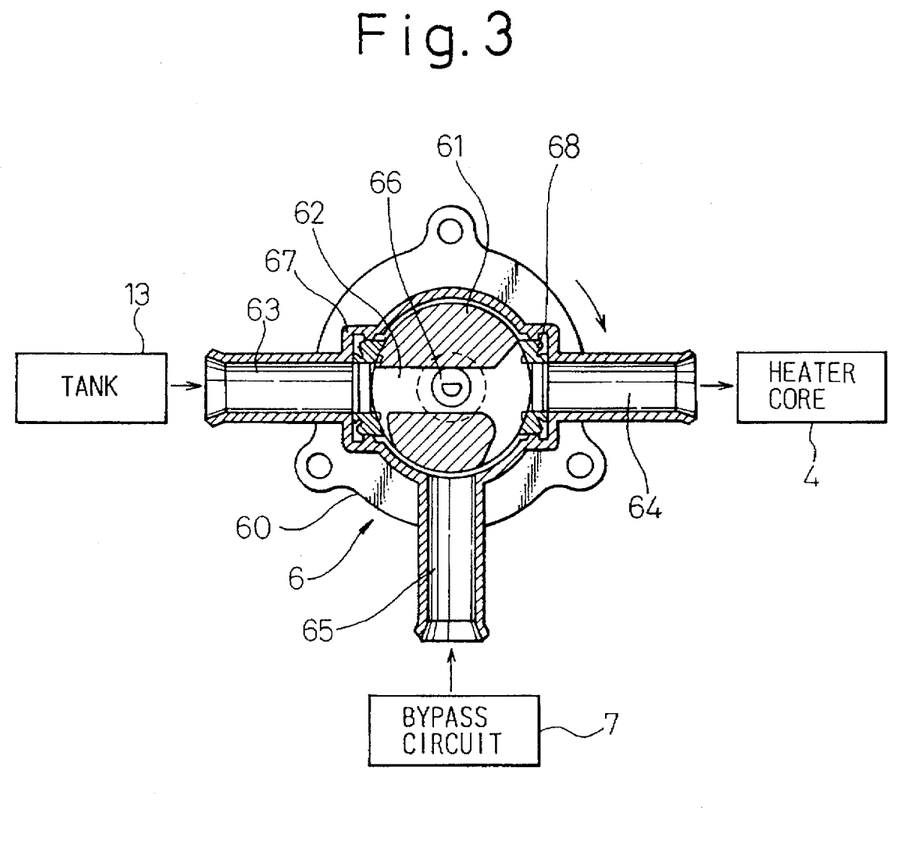
FIG. 3 is an enlarged cross-sectional view of the flow control valve of FIG. 2.

FIGS. 2 and 3 typically illustrate the detailed structure of the flow control valve 6. A circular cylindrical valve body 61 made of resin is rotatably accommodated in a valve housing 60 made of resin, and a control flow passage 62 is formed in the circular cylindrical valve body (rotor) 61 for controlling the flow of coolant.

An inlet pipe 63, a first outlet pipe 64, and a second outlet pipe 65 are connected to and integrally formed with the valve housing 60 by molding. The coolant flows from the heat accumulation tank 13 into the flow control valve 6 through the inlet pipe 63. The first outlet pipe 64 is connected to the inlet side of the heater core 4 and the second outlet pipe 65 is connected to the inlet side of the bypass circuit 7.

The control flow passage 62 is shaped in such a manner that one of the ends thereof regulates the opening area of the inlet pipe 63 and the other end thereof regulates the opening areas of the first and second outlet pipes 64 and 65.

The circular cylindrical valve body (rotor) 61 has at its outer ends shaft portions 66 (see FIG. 3) for rotating the valve body 61, and the rotation of the servo motor 6a described above is transmitted to the shaft portions 66 to rotate the valve body 61 in the housing 60. Reference numerals 67 and 68 denote seal packings made of rubber.

Figure 4:
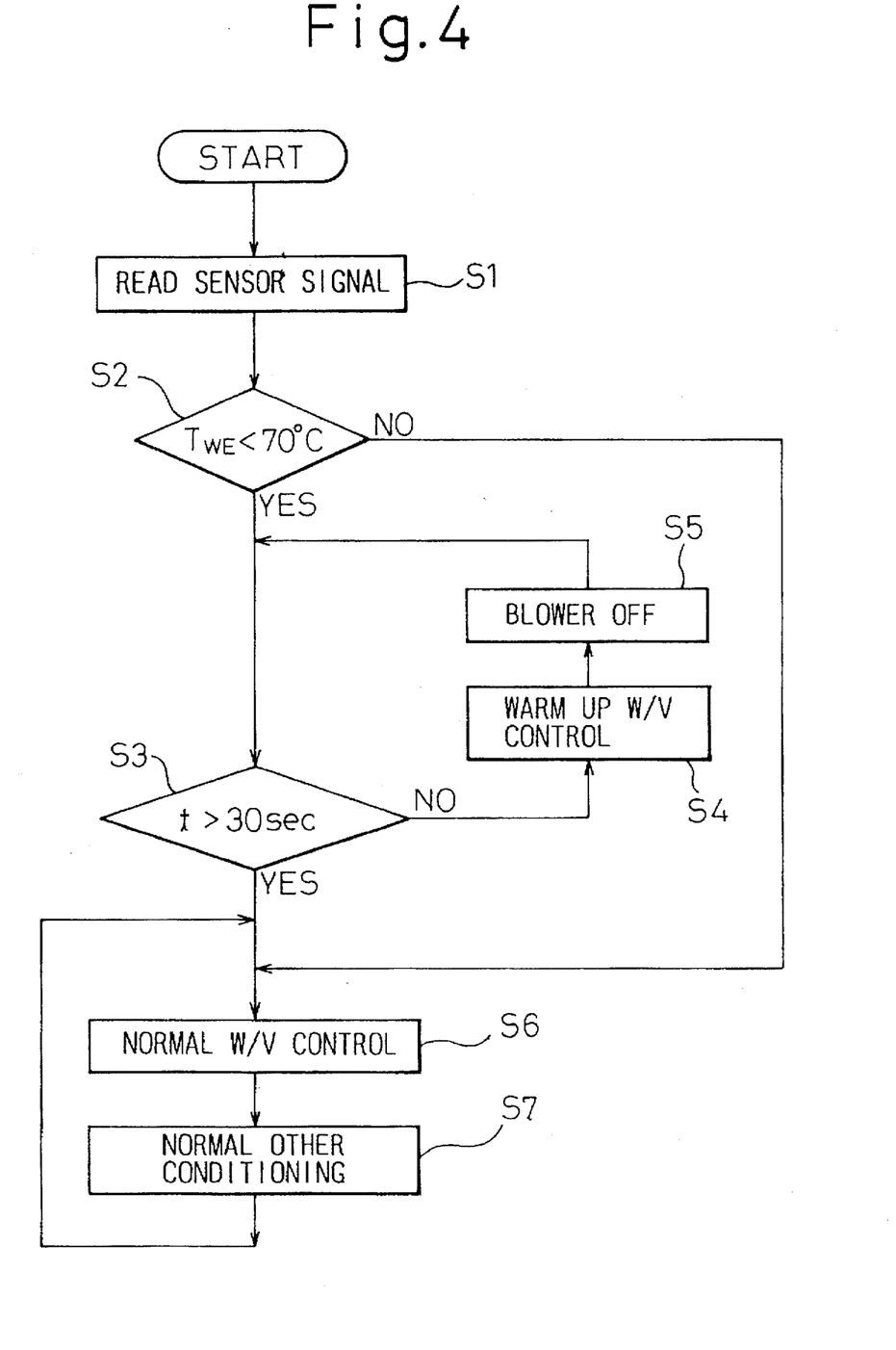
FIG. 4 is a flowchart illustrating an example of the control operation in the first embodiment of the present invention.

The operation of this embodiment having the construction described above will now be explained, with reference to FIG. 4 which is a flowchart illustrating the control operation executed by the electronic controller 19. It will be assumed here that an ignition switch (engine key switch) of the vehicle is now turned on and the engine I is started, so the electronic controller 19 is switched on and the control routine shown in FIG. 4 is started.

The signals from the sensors 16 and 17 and the switches 18 are read at the step S1, and it is judged whether the coolant temperature TWB detected by the temperature sensor 16 at the coolant outlet from the engine 1 is lower than a predetermined temperature (70° C. in this embodiment) at the step S2.

When the internal combustion engine 1 is restarted after a considerable period of time has passed from the previous stop of the engine 1, the coolant temperature may drop below 70° C. Therefore, the result of step S2 proves YES, and the program goes to the next step S3. At this step S3, it is judged whether the time "t" measured from the start of the engine 1 exceeds a predetermined time (30 seconds in this embodiment).

When the engine 1 is still warming up immediately after the start, the result of step S3 proves NO, and the program goes to the step S4, where the flow control valve 6 is controlled according to the warm-up mode. That is, the valve body 61 of the flow control valve 6 is rotated to the position ③ in FIG. 2 by the servo motor 6a on the basis of the signal from the electronic controller 19, so that the bypass circuit 7 is completely closed and the flow passage to the heater core 4 is fully opened.

The program then proceeds to the next step S5, at which the blower 5 for air conditioning is turned off. The flow control valve 6 and the blower 5 are kept in this position for a predetermined time until the result of the step S3 proves YES.

The water pump 1 is driven by the start of the engine 1, and low temperature coolant in the engine 1 is caused to flow into the heat accumulation tank 13. High-temperature coolant (about 80° C.) stored in the heat accumulation tank 13 is therefore forced from the outlet pipe 13b and flows into the heater core 4 through the flow control valve 6 which is in the full open condition.

Because the blower 5 is not operating, the high temperature coolant loses hardly any heat and the coolant flows into the intake air heat exchanger 9 while maintaining its high temperature. Because high temperature coolant heats the intake air sucked into the engine 1 through the intake air heat exchanger 9, the intake air temperature rises and the fuel demands during engine warm-up can be reduced. Therefore, the fuel efficiency can be improved.

Since intake air has a small heat capacity at this time, the drop of the coolant temperature in the intake air heat exchanger 9 is only about 2° C. For this reason, the coolant temperature is still kept at a high temperature of about 78° C. even at the outlet of the intake air heat exchanger 9.

Next, coolant flows from the intake air heat exchanger 9 into the first and second oil heat exchangers 10 and 11 that are juxtaposed in parallel with each other, to heat the engine lubricating oil and the transmission operating oil, whereby frictional loss in the engine 1 is reduced and also the fuel efficiency is improved. The increase in the oil temperature also promotes engine warm-up.

After coolant passes through the oil heat exchangers 10 and 11, its temperature drops to about 50° C. However, because this coolant temperature is higher than the coolant temperature in the engine 1 which has dropped to the temperature substantially equal to the external air temperature, coolant of about 50° C. passing through both oil heat changers 10 and 11 returning into the engine 1 can promote warm-up of the engine 1.

Accordingly, the coolant temperature of the engine 1 rises to a temperature of about 35° C. within a short time of about 30 seconds, and warm-up of the engine 1 can be completed quickly.

Therefore, the reduction of fuel consumption and exhaust emissions during engine warm-up can be effectively accomplished. At the same time, it is possible to start compartment heating using heat radiating from the coolant flowing in the heater core 4 within a short time after the start of the engine, since the coolant temperature of the engine 1 quickly rises.

The pre-determined time at the step S3 is set to 30 seconds in this embodiment, but this time can be optionally increased or decreased in accordance with the capacity of the heat accumulation tank 13 and the exhaust capacity and coolant capacity of the engine 1.

When the time "t" exceeds 30 seconds after the start of the engine, the result of step S3 proves YES and the program goes to step S6, at which the flow control valve 6 is controlled in the normal air conditioning mode. That is, opening of the valve body 61 of the flow control valve 6 is calculated on the basis of the input signals from the sensors 16, 17 and the air conditioner switches 18 (inclusive of the temperature setting switch) so as that the temperature in the compartment is maintained at a desired temperature, and the valve body 61 is rotated to the opening so calculated.

The position ③ of the valve body 61 of the flow control valve 6 in FIG. 2 is the fully open condition during warm-up, as described above. This position is also the condition of the flow control valve 6 to the heater core 4 in the normal air conditioning mode to heat the compartment to the greatest degree. At this position, the flow passage to the bypass circuit 7 is fully closed, as already described.

The position ② in FIG. 2 represents the condition where the valve body 61 is rotated to a smaller opening, so that both the inlet side coolant flow passage from the heat accumulation tank 13 and the flow passage to the heater core 4 are restricted to small opening areas whereas the opening area of the flow passage to the bypass circuit 7 is increased. This represents a fine capacity control.

The position ① in FIG. 2 represents the condition where opening of the valve body 61 is zero, in which the flow passage to the heater core 4 is fully closed and the compartment heating is not carried out (maximum refrigeration can be accomplished in this position). In this position, it is possible to slightly open the inlet side coolant flow passage 63 from the heat accumulation tank 13 so as to allow coolant to continuously flow through the bypass circuit 7. According to this construction, the flow of coolant continues and consequently, it becomes possible to effectively prevent the control flow passage 62 of the valve body 61 from being closed by foreign matter such as cast sand contained in the coolant.

It is possible to maintain the temperature in the compartment to a desired temperature by regulating the quantity of hot coolant flowing through the heater core 4, by continuously controlling the opening of the valve body 61 within the range of the positions from ① to ③ in FIG. 2

Next, at the step S7, the other normal air conditioning controls such as control of the quantity of air blown by the blower 5, the internal/external air introduction switching door, or switching of the blowing mode, is carried out.

The control operations of the steps S6 and S7 are then continued until the engine 1 stops or the air conditioner operation switch is turned off.

When ordinary air conditioning control is carded out at the steps S6 and S7 (during normal driving after the engine has warmed up), as described above, and the season is spring, summer, or fall, the valve body 61 of the flow control valve 6 is often rotated to an intermediate opening position or a smaller opening position in proximity to the position ② in FIG. 2. Therefore, a relatively restricted quantity of cooling water flows from the flow control valve 6 into the heater core 4.

Accordingly, coolant at a low flow rate is subjected to heat exchange with air blown by the blower 5 in the heater core 4 and the temperature drops to a low temperature of 15° to 20° C. Therefore, intake air of the engine 1 can be effectively cooled by this low temperature coolant in the intake air heat exchanger 9, and the fuel cost can be reduced.

Since the quantity of coolant flowing through the heater core 4 is decreased at this time, the quantity of coolant passing through the heater core 4 is not sufficient for cooling the oil. However, because the first and second oil heat-exchangers 10 and 11 are disposed on the downstream side of the merging point "A" with the bypass circuit 7, coolant also flows from the bypass circuit 7 through the first and second oil heat exchangers 10 and 11 in addition to coolant flowing through the heater core 4, so that the total coolant flow can effectively cool the engine lubricating oil and the transmission operating oil.

Since a larger heating capacity is required in winter, the valve body 61 of the flow control valve 6 is often rotated to the position ③ in FIG. 2 in proximity to the full open condition. In this condition, therefore, a large amount of coolant flows from the flow control valve 6 into the heater core 4.

Because the flow rate of coolant increases as described above, the coolant temperature drops only to a temperature of about 50° C. to 65° C. at the outlet of the heater core 4 even when coolant is subjected to heat exchange with air blown by the blower 5 in the heater core 4. Accordingly, intake air of the engine 1 can be effectively heated by this coolant having a relatively high temperature, and the fuel consumption can be improved.

Further, since the thermal capacity of intake air is small, the oil in the first and second oil heat exchangers 10 and 11 can be heated by coolant after it passes through the intake air heat exchanger 9.

Accordingly, during normal driving after the engine has warmed up, the intake air temperature as well as the oil temperature can be satisfactorily controlled throughout the full season of the year, and fuel consumption and exhaust emissions reduced. Needless to say, cooling of the coolant is effected by the radiator 2 in the same way as in the prior art.

When the engine 1 is re-started within a short time after it was stopped, the result of step S2 in FIG. 4 becomes NO. Therefore, air conditioning control of the steps S6 and S7 is executed immediately after the start of the engine 1 and warm-up control (steps S4, S5) is not executed.

Figure 5:
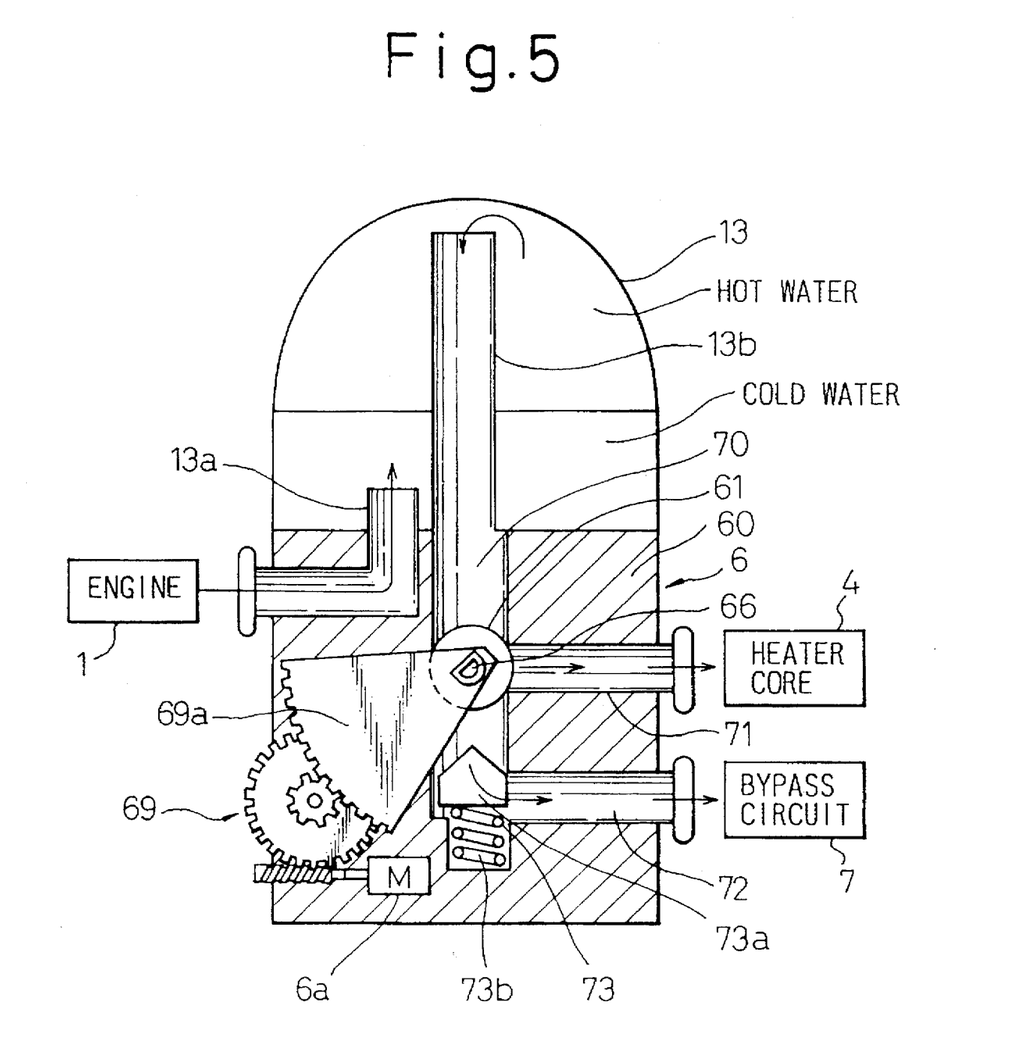
FIG. 5 is a cross-sectional view of a heat accumulation tank according to the second embodiment of the present invention.

FIG. 5 shows the second embodiment of the present invention. In this embodiment, the flow control valve 6 is integrally formed with the heat accumulation tank 13. The valve housing 60 of the flow control valve 6 is integrally connected to the lower part of the heat accumulation tank 13, and the servo motor 6a for driving the valve body 61 and a reduction gear mechanism 69 are disposed in the valve housing 60. The shaft portions 66 for rotating the circular cylindrical valve body 61 are integrally connected to the center of rotation of a segment-shaped gear 69a on the output side of this reduction gear mechanism 69.

The circular cylindrical valve body 61 is rotatably disposed in the coolant flow passage 70 in the valve housing 60 connected to the outlet portion (lower end portion) of the outlet pipe 13b of the accumulation tank 13. The control flow passage 62 is formed in the valve body 61, though not shown in FIG. 5, and control of the coolant flow rate can be made in the same way as in the first embodiment.

The coolant circuit downstream of the circular cylindrical valve body 61 is branched into two flow passages. One of the coolant flow passages 71 is connected to the coolant flow passage on the inlet side of the heater core 4 and the other coolant flow passage 72 is connected to the inlet side flow passage of the bypass circuit 7.

A pressure responsive valve 73, the opening of which increases with an increase in the coolant pressure, is disposed at an intermediate part of the latter flow passage 72 to the bypass circuit 7. The pressure responsive valve 73 includes a valve body 73a and a spring 73b, and the opening of the valve body 73a changes in accordance with the balance of the coolant pressure and the spring force of the spring 73b.

Therefore, when the revolution of the engine 1 and thus the revolution of the water pump 3 changes to thereby alter the coolant pressure, the opening of the valve body 73a changes in accordance with fluctuations in the coolant pressure, so that the change of the coolant flow rate to the heater core 4 is restricted and the blown air temperature of the heater core 4 is maintained with greater consistency.

Moreover, because the flow control valve 6 is integrated with the heat accumulation tank 13, the overall construction of the cooling system can be simplified and can be made compact.

Incidentally, in the first embodiment, the first and second oil heat exchangers 10 and 11 are juxtaposed in parallel with each other between the merging point "A" and the intake side coolant circuit 12 of the water pump 3, but the oil heat exchangers 10 and 11 can be disposed in series. In this case, it is preferable to dispose the second oil heat exchanger 11 including the transmission operating oil at a suitable operation temperature of about 80° C. on the downstream side of the first oil heat exchanger 10 including the engine lubricating oil at a suitable operation temperature of about 110° C., whereby the fuel consumption reduction effected by the reduction of the frictional loss can be increased.

Further, at the step S3 in FIG. 4 in the first embodiment, the completion of warm-up is judged by determining whether the time "t" exceeds the predetermined time after the start of the engine, but other judgment methods, such as determining whether the coolant temperature at the outlet portion of the engine 1 detected by the temperature sensor 16 has risen to a predetermined temperature, can also be employed.

In the first embodiment, the valve body 61 of the flow control valve 6 is set such that the flow passage from the flow control valve 6 to the heater core 4 is fully open during warm-up immediately after the start of the engine. However, the valve body 61 of the flow control valve 6 is not necessarily brought into the fully open position but may be set to a substantially full open condition during warm-up, so that some coolant is allowed to flow through the bypass circuit 7.

We claim:

1. A coolant circulating system in a water-cooled internal combustion engine of a vehicle, said system comprising:

a coolant circuit including a circulation pump for circulating coolant through the engine, the coolant circuit having a direction of circulation;

a heat accumulation tank having a heat insulating structure for accumulating therein coolant flowing out from the engine;

a heater core disposed on the downstream side of the heat accumulation tank for exchanging heat between the coolant flowing out from the heat accumulation tank and air for heating a compartment in the vehicle;

heat exchanger means disposed in the coolant circuit on the downstream side of the heater core for exchanging heat between the coolant and at least one of the engine lubricating oil, the automatic transmission operating oil, and engine intake air; and a coolant circuit portion for connecting the heat exchanger means on the downstream side thereof to the inlet side of the engine.

2. A coolant circulating system according to claim 1, further comprising:

a blower for blowing air through the heater core;

a flow control valve disposed in the coolant circuit between the heat accumulation tank and the heater core for controlling the flow rate of coolant flowing through the heater core; and control means for controlling the operation of the flow control valve and the blower according to whether the engine has warmed up.

3. A coolant circulating system according to claim 2, wherein said control means controls the flow control valve and the blower so that the flow control valve is fully open and the blower is off when the engine is warming-up.

4. A coolant circulating system according to claim 2, wherein said control means controls the flow control valve and the blower in accordance with an air conditioning control program after the engine has warmed up.

5. A coolant circulating system according to claim 2, further comprising a bypass circuit disposed in parallel with the heater core for allowing coolant to bypass the heater core, the bypass circuit merging with the coolant circuit on the downstream side of the heater core at a merging point;

said flow control valve comprising a three-way valve for controlling a flow of coolant through the heater core and a flow of coolant through the bypass circuit; and said heat exchanger means comprising a first heat exchanger for exchanging heat between the coolant and at least one of the engine lubricating oil and the automatic transmission operating oil and a second heat exchanger for exchanging heat between the engine intake air and the coolant, the second heat exchanger being disposed in the coolant circuit between the heater core and the merging point, the first heat exchanger being disposed in the coolant circuit on the downstream side of the merging point.

6. A coolant circulating system according to claim 2, wherein said control means determines that the engine has not warmed up when the coolant temperature at the start of the engine is below a predetermined value and the time passed since the start of the engine is within a predetermined time.

7. A coolant circulating system according to claim 2, wherein said control means controls the flow control valve and the blower in accordance with an air conditioning control program after the engine has warmed up.

8. A coolant circulating system according to claim 7, wherein said heat exchanger means comprises a first heat exchanger for exchanging heat between the engine lubricating oil and the coolant and a second heat exchanger for exchanging heat between the automatic transmission operating oil and the coolant.

9. A coolant circulating system according to claim 8, further comprising a bypass circuit disposed in parallel with the heater core for allowing coolant to bypass the heater core, the bypass circuit merging with the coolant circuit on the downstream side of the heater core at a merging point, wherein said flow control valve comprises a three-way type flow control valve including a valve body having control flow passages for controlling at least an opening area of a coolant flow passage to the heater core and an opening area of a coolant flow passage to the bypass circuit.

10. A coolant circulating system according to claim 7, further comprising a bypass circuit disposed in parallel with the heater core for allowing coolant to bypass the heater core, the bypass circuit merging with the coolant circuit on the downstream side of the heater core at a merging point, wherein said flow control valve comprises a three-way type flow control valve including a valve body having control flow passages for controlling at least an opening area of a cooling water flow passage to the heater core and an opening area of a coolant flow passage to the bypass circuit.

11. A coolant circulating system according to claim 1, wherein said heat exchanger means comprises a first heat exchanger for exchanging heat between the engine lubricating oil and the coolant and a second heat exchanger for exchanging heat between the automatic transmission operating oil and the coolant.

12. A coolant circulating system according to claim 11, wherein said first and second oil heat exchangers are connected in parallel with each other.

* * * * *